United States Patent
Watanabe (10) Patent No.: US 9,467,942 B2
(45) Date of Patent: Oct. 11, 2016

(54) WIRELESS COMMUNICATION NETWORK SYSTEM, WIRELESS COMMUNICATION STATION, WIRELESS COMMUNICATION DEVICE, AND BATTERY CONSUMPTION SMOOTHING METHOD

(71) Applicant: SOCIONEXT INC., Yokohama-shi, Kanagawa (JP)

(72) Inventor: Tomoyuki Watanabe, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 215 days.

(21) Appl. No.: 14/220,518

(22) Filed: Mar. 20, 2014

(65) Prior Publication Data
US 2014/0293852 A1 Oct. 2, 2014

(30) Foreign Application Priority Data
Apr. 2, 2013 (JP) .................................. 2013-077041

(51) Int. Cl.
*H04W 52/02* (2009.01)
(52) U.S. Cl.
CPC ..... *H04W 52/0219* (2013.01); *H04W 52/0277* (2013.01)
(58) Field of Classification Search
None
See application file for complete search history.

(56) References Cited

U.S. PATENT DOCUMENTS

| 6,026,303 A | 2/2000 | Minamisawa |
| 2010/0195574 A1* | 8/2010 | Richeson ............... G01D 4/004 370/328 |
| 2014/0370939 A1* | 12/2014 | Ritter ................. G01R 31/3648 455/572 |

FOREIGN PATENT DOCUMENTS

| JP | 10-145276 | 5/1998 |
| JP | 2001-36459 | 2/2001 |

* cited by examiner

*Primary Examiner* — Noel Beharry
*Assistant Examiner* — Wilfred Thomas
(74) *Attorney, Agent, or Firm* — Staas & Halsey LLP (57) ABSTRACT

A wireless communication network system includes a first wireless communication device; and second wireless communication devices. The first wireless communication device selects a master unit from among the second wireless communication devices, on the basis of reception quality and storage battery remaining levels, and sends, to the selected master unit, a master unit request and a storage battery remaining level threshold for the master unit. The selected second wireless communication device operates as the master unit in accordance with the master unit request, and monitors the storage battery remaining level of the selected second wireless communication device on the basis of the storage battery remaining level threshold. When the storage battery remaining level of the selected second wireless communication device does not match the storage battery remaining level threshold, the selected second wireless communication device sends a master unit change request to the first wireless communication device.

14 Claims, 9 Drawing Sheets

| STORAGE BATTERY REMAINING LEVEL | RECEPTION INTENSITY | STORAGE BATTERY REMAINING LEVEL THRESHOLD VALUE |
|---|---|---|
| HIGH | HIGH | FOR EXAMPLE, 10% OF STORAGE BATTERY CAPACITY |
| HIGH | MIDDLE | FOR EXAMPLE, 20% OF STORAGE BATTERY CAPACITY |
| HIGH | LOW | FOR EXAMPLE, 30% OF STORAGE BATTERY CAPACITY |
| MIDDLE | HIGH | FOR EXAMPLE, 20% OF STORAGE BATTERY CAPACITY |
| MIDDLE | MIDDLE | FOR EXAMPLE, 30% OF STORAGE BATTERY CAPACITY |
| MIDDLE | LOW | FOR EXAMPLE, 40% OF STORAGE BATTERY CAPACITY |
| LOW | HIGH | FOR EXAMPLE, 30% OF STORAGE BATTERY CAPACITY |
| LOW | MIDDLE | FOR EXAMPLE, 40% OF STORAGE BATTERY CAPACITY |
| LOW | LOW | FOR EXAMPLE, 50% OF STORAGE BATTERY CAPACITY |

WIRELESS COMMUNICATION NETWORK SYSTEM, WIRELESS COMMUNICATION STATION, WIRELESS COMMUNICATION DEVICE, AND BATTERY CONSUMPTION SMOOTHING METHOD

CROSS-REFERENCE TO RELATED APPLICATION

This patent application is based upon and claims the benefit of priority of the prior Japanese Patent Application No. 2013-077041 filed on Apr. 2, 2013, the entire contents of which are incorporated herein by reference.

FIELD

The embodiments discussed herein are related to a wireless communication network system, and a wireless communication station, a wireless communication device, and a battery consumption smoothing method used in the wireless communication network system.

BACKGROUND

In recent years, the smart grid technology has been attracting attention. The smart grid concept is for connecting companies supplying energy such as electricity, gas, and water, with meters deployed in general households, by a power distribution grid provided with communication channels, and collecting and controlling data. The object of this concept is to save power, reduce costs, and to improve the reliability of information collection.

In each meter, a device is mounted, which has a sensor function and a wireless communication function, and data collection and control are performed for each smart utility network (SUN) in a certain range. The device mounted in the meter is driven by a battery (storage cell) so as to be operable even when a disaster occurs. As part of an attempt to reduce costs, the target battery life is ten years.

SUN constructs a communication system according to multihop communication (ad hoc communication) or public network communication (3G or WiMAX communication). Multihop communication is a communication method by which terminals perform relay with each other and a single master unit controls a plurality of slave units to construct a network.

In multihop communication, the data owned by the slave units is sequentially passed from the end terminal devices of the network to the master unit. The data that is passed is accumulated as the data approaches the master unit. As to the data processing amount, the processing amount is minimal at a slave unit at the end of the network, and the processing amount is maximum at the master unit. Comparing the consumption amount of batteries driving the terminals, the battery consumption of a master unit is significantly higher than that of a slave unit.

In the case of SUN, once a network is constructed, the network is maintained for a long period of time (for example, ten years), unlike the case of a multihop communication network constructed by game consoles, etc. However, if the battery of the master unit is consumed more quickly than that of the slave unit, it is not possible to maintain the network.

In order to prevent communication failures caused by the poor performance of the master unit during multihop communication, there is proposed a method of re-selecting a master unit (see, for example, Patent Document 1). By this method, a slave unit that wants to start communication searches for a master unit, and when there is no master unit nearby, the slave unit sends out test signals. The slave unit receives, from other terminals, the transfer rate and the remaining battery level, and determines a master unit. The master unit is not changed unless communication by a terminal that has become the master unit stops, or radio interruption occurs. Therefore, it is not possible to smoothen the remaining battery level among all terminals including the master unit and slave units.

In a network that is used over a long span, it is preferable that the battery consumption is smoothened among all of the terminals in the network.

Patent Document 1: Japanese Laid-Open Patent Publication No. H10-145276

SUMMARY

According to an aspect of the embodiments, a wireless communication network system includes a first wireless communication device; and a plurality of second wireless communication devices, wherein the first wireless communication device is configured to select a master unit from among the plurality of second wireless communication devices, on the basis of reception quality information and storage battery remaining levels of the plurality of second wireless communication devices, and to send, to the selected master unit, a master unit request notification and storage battery remaining level threshold information for the master unit, and a selected second wireless communication device selected as the master unit from among the plurality of second wireless communication devices, is configured to operate as the master unit in accordance with the master unit request notification, and to monitor the storage battery remaining level of the selected second wireless communication device on the basis of the storage battery remaining level threshold information, and when the storage battery remaining level of the selected second wireless communication device does not match the storage battery remaining level threshold information, the selected second wireless communication device sends a master unit change request to the first wireless communication device.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DESCRIPTION OF EMBODIMENTS

Preferred embodiments of the present invention will be explained with reference to accompanying drawings.

Figure 1:
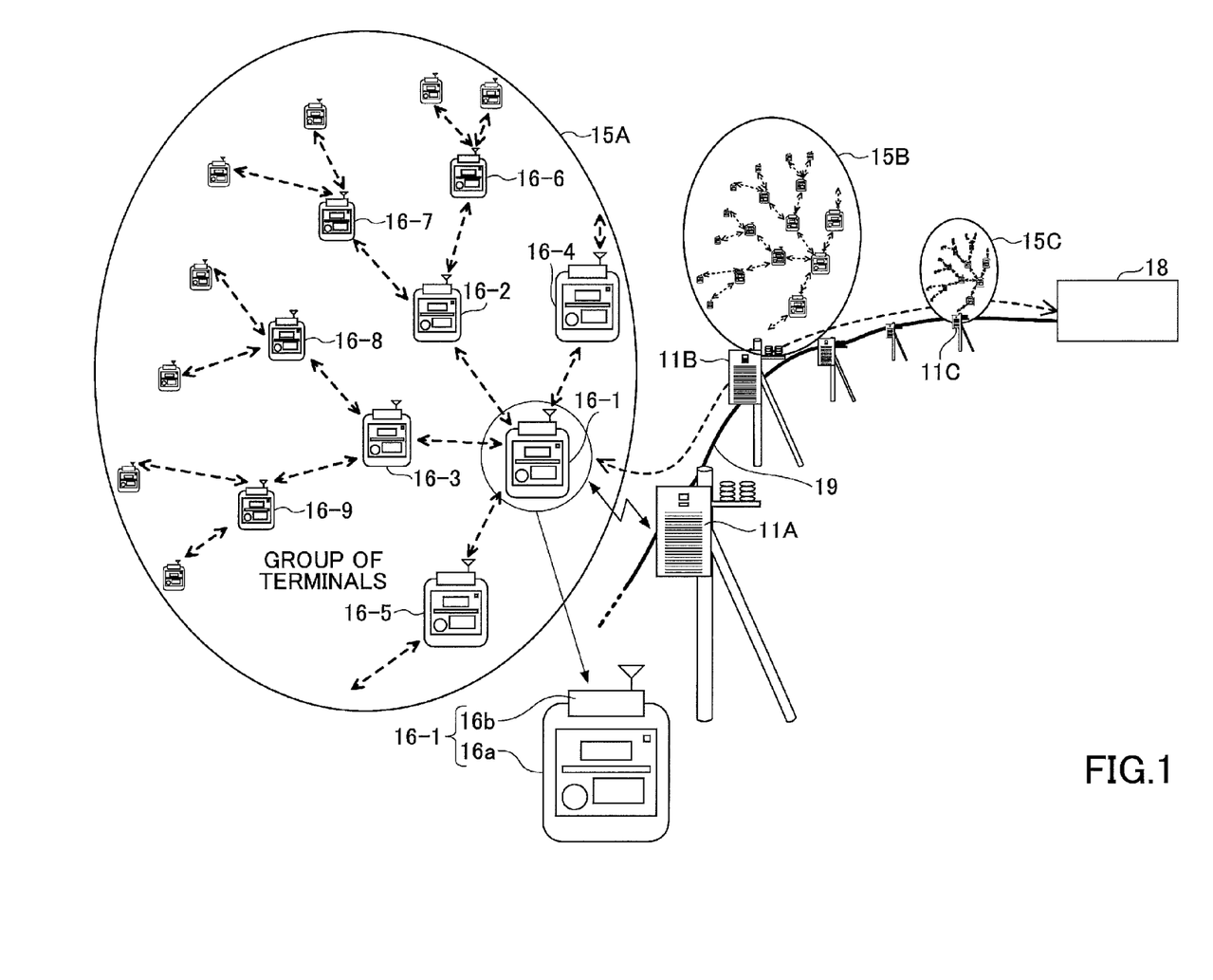
FIG. 1 illustrates an example of a smart grid network to which a wireless communication system according to an embodiment is applied.

FIG. 1 illustrates an example of a smart grid network to which a wireless communication system according to an embodiment is applied. The smart grid network uses a transmission network 19 capable of communication, and forms a communication network connecting a server 18 of an energy supply company with relay stations 11A, 11B, . . . (hereinafter, collectively referred to as "relay stations 11" accordingly). For each relay station 11, a network 15 is formed by a plurality of terminal devices 16-1 through 16-n (hereinafter, collectively referred to as "terminal devices 16" accordingly). In this example, the network 15 is a smart utility network (SUN) 15.

Each of the terminal devices 16 constituting the SUN 15 includes a meter 16a and a wireless terminal 16b mounted in the meter 16a. The wireless terminal 16b includes a wireless communication function, a function of monitoring the remaining battery level of the terminal device 16, and a master unit processing function implemented when the terminal device 16 becomes a master unit. Detailed configurations of the wireless terminal 16b are described below. The collection and control of data between the terminal devices 16 are performed for each SUN 15.

In the embodiment, the relay station 11 dynamically selects an appropriate master unit, and smoothens the battery consumption among all of the terminal devices 16 present in the SUN 15. In the example of FIG. 1, the terminal device 16-1 is selected as the present master unit. The terminal device 16-1 and the relay station 11 are connected by wireless connection.

The data, which is integrated from a plurality of terminal devices (slave units) 16 to the master unit 16-1, is sent to the server 18 of the energy supply company via the relay station 11. Furthermore, from the server 18 of the energy supply company, control signals are supplied to the master unit 16-1 via the relay station 11. The control signals are sequentially sent via the slave units to all of the terminal devices 16 included in the SUN 15 from the master unit 16-1.

Figure 2:
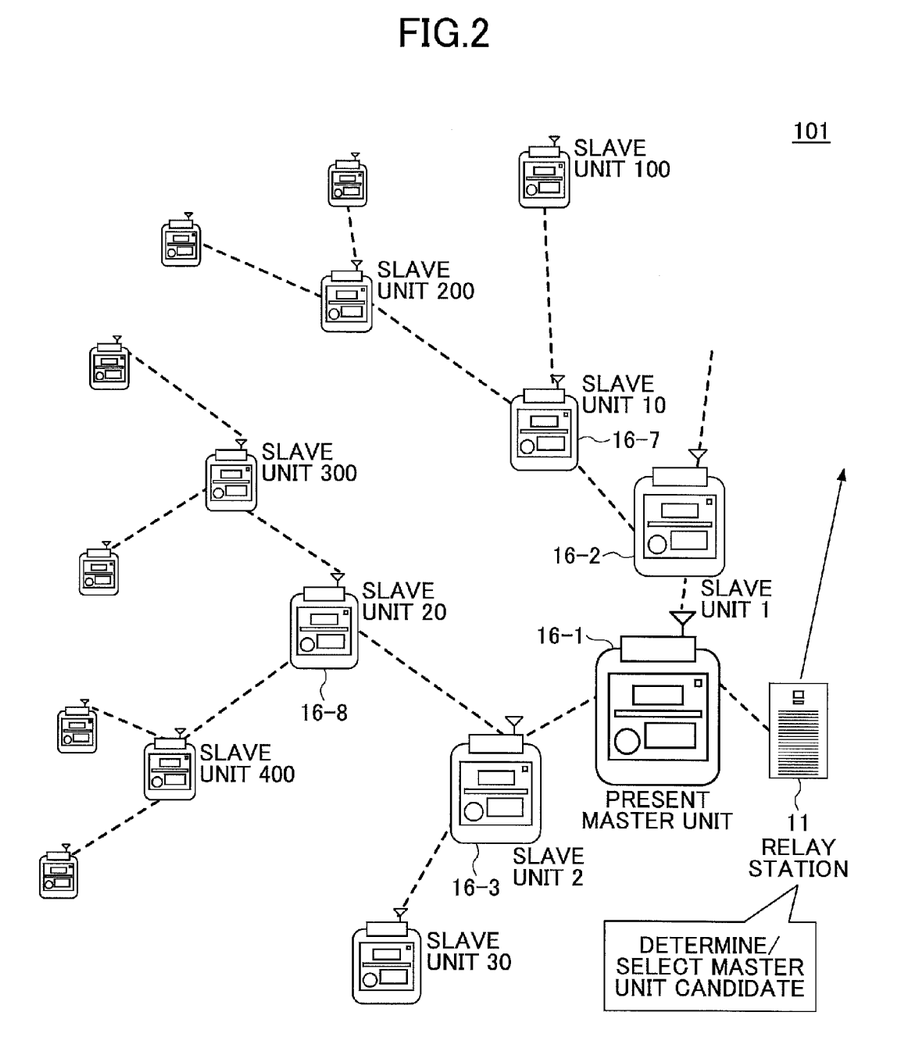
FIG. 2 illustrates an example of a wireless communication system according to an embodiment.

FIG. 2 is a schematic diagram of a communication network system 101 including the SUN 15. The communication network system 101 includes the relay station 11 and a plurality of terminal devices 16. When the terminal device 16-1 is selected as a master unit, the terminal devices 16-2, 16-3, which are within a predetermined distance range from the master unit 16-1, are slave units 1, 2 of a first layer. The terminal devices 16-7, 16-8, which are within a predetermined distance range from the slave units 1, 2, are slave units 10, 20 of a second layer. By sequentially performing relay between the terminal devices 16, the communication range is extended.

The terminal device 16-1 that is the master unit integrates the data that has been sequentially collected from the slave units at the end. As a collection route of data, in the network, a transfer tree may be set in advance, according to which terminal device 16 is the master unit. Alternatively, a transfer route may be generated by periodically exchanging link information between the terminal devices 16.

The relay station 11 selects a new master unit in response to a master unit change request from the present master unit 16-1. To the selected master unit, the relay station 11 sends a master unit request notification, and also sends a notification of a storage battery remaining level threshold value that acts as the trigger for issuing the master unit change request by the master unit. The terminal device 16 that has become the master unit performs processes as a master unit while monitoring the storage battery remaining level of itself (self-device).

Figure 3:
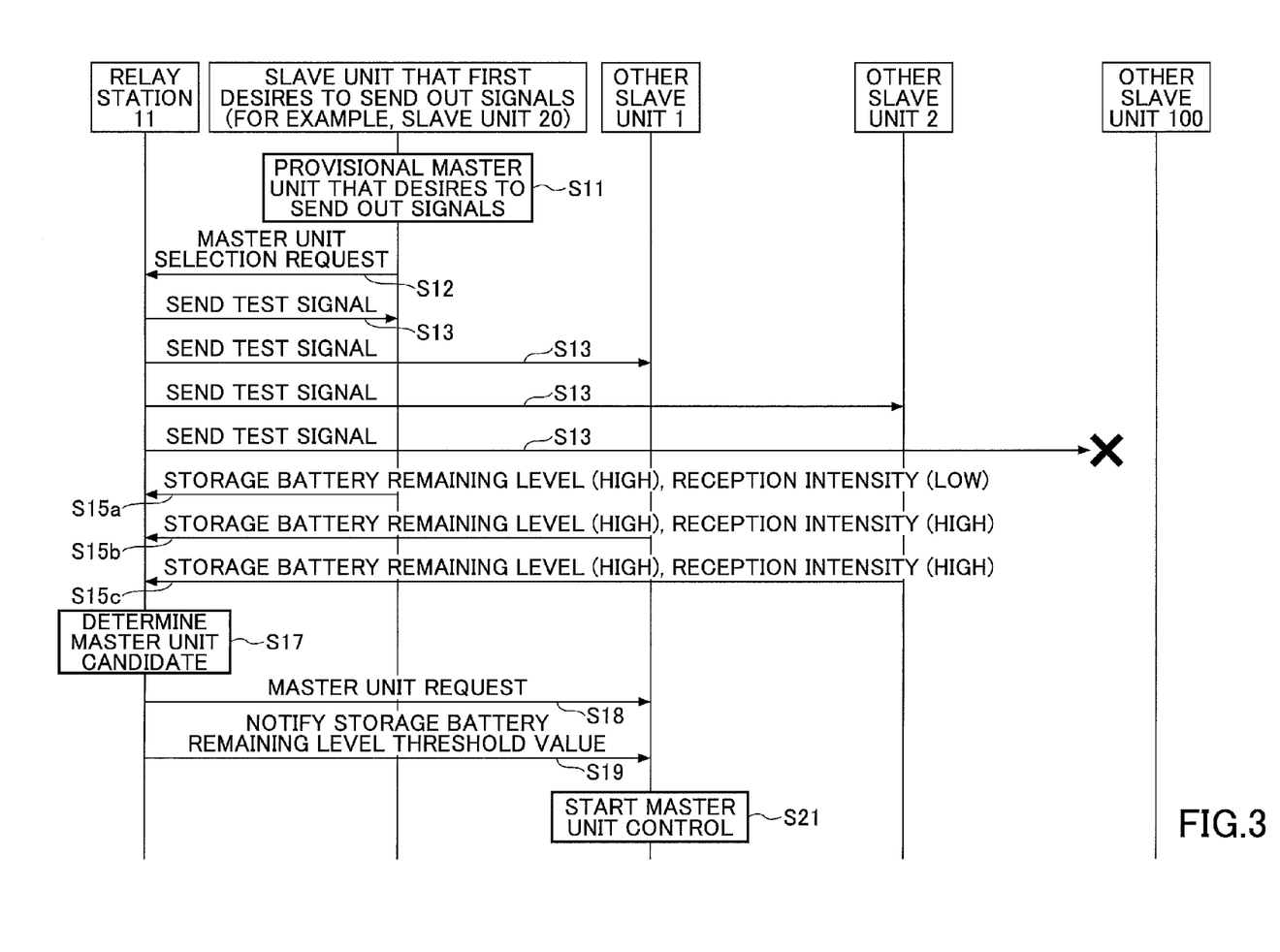
FIG. 3 is a sequence diagram of a master unit selection flow when starting communication.

FIG. 3 is a sequence diagram of a master unit selection process performed when the communication network system 101 starts communication. A terminal device 16 (for example, a slave unit 20) that first desires to send out signals becomes a provisional master unit, and communication is started (step S11).

The slave unit 20 desiring to send out signals sends a master unit selection request to the relay station 11 (step S12). In response to the master unit selection request, the relay station 11 sends test signals for determining the master unit to slave units (terminal devices 16) in the network 15 (step S13). The test signals are received at the terminal devices 16 that are within a range reached by signals from the relay station 11. For example, the test signals are received at slave units 20, 1, 2, but not at slave unit 100. Although not illustrated, the test signals may also be received at other slave units 20, 30 (see FIG. 2). According to the link status, the test signals may also be received at slave units 100, 200, etc.

All of the slave units 20, 1, 2 that have received the test signals measure and detect the reception intensity or reception quality, the storage battery remaining level of the self-device, etc., and sends self-device information (information regarding the slave unit itself) to the relay station 11 (steps S15a, S15b, S15c). The relay station 11 determines master unit candidates based on the information received from the slave units 20, 1, 2, and selects a new master unit from among the master unit candidates (step S17). The relay station 11 sends a notification of a master unit request to the selected slave unit (for example, slave unit 1) (step S18). At this time, together with the master unit request, the relay station 11 notifies the storage battery remaining level threshold value for the selected slave unit 1 (step S19). The selected slave unit 1 starts to implement control as a master unit (step S21).

Figure 4:
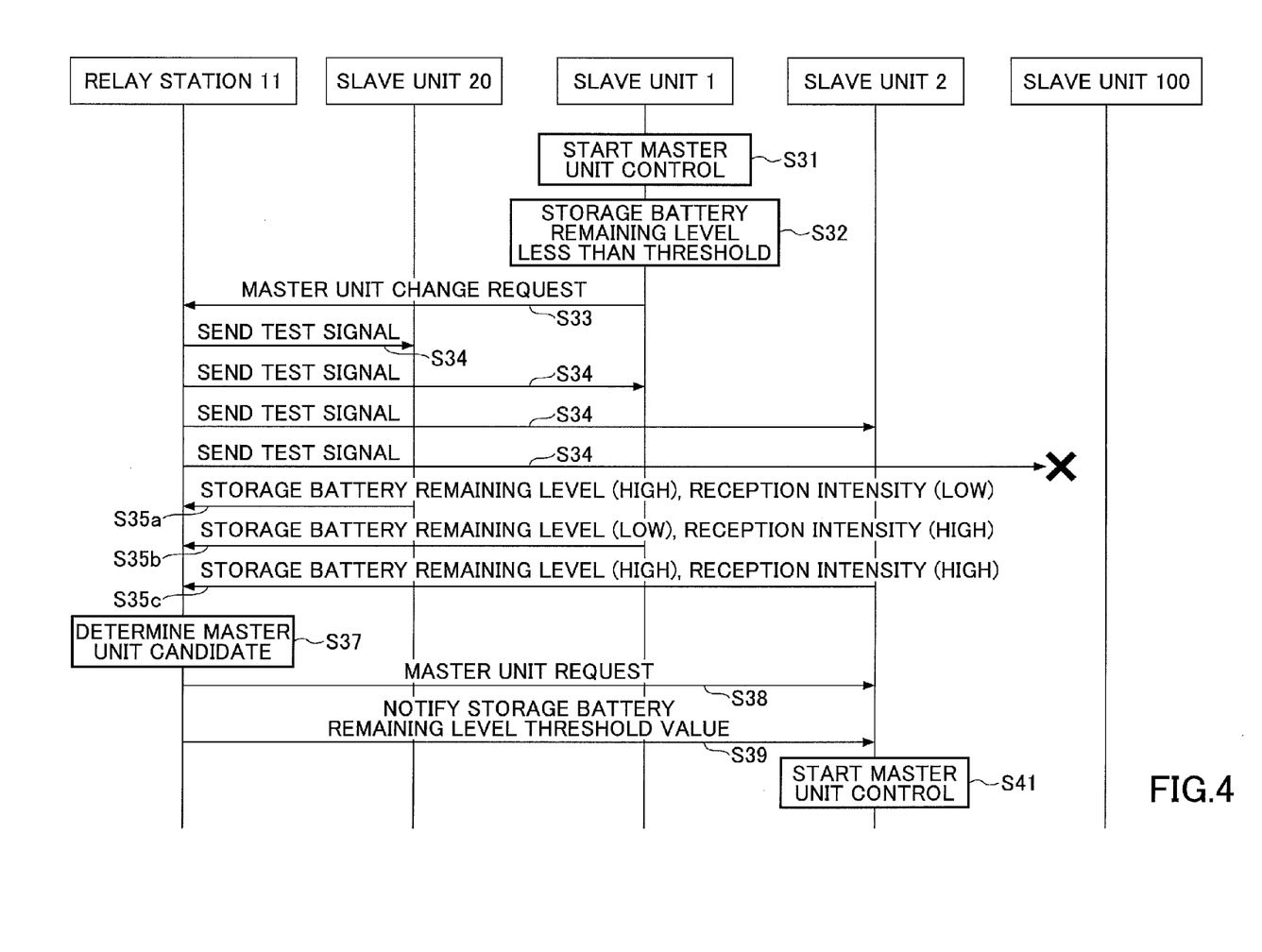
FIG. 4 is a sequence diagram indicating a master unit selection/change process during communication.

FIG. 4 is a sequence diagram indicating a master unit change process (re-selection). The slave unit 1 that has been selected as a master unit starts implementing control as a master unit (step S31). The slave unit 1 that has become the master unit monitors the storage battery remaining level of the self-device, and determines whether the storage battery remaining level is greater than or equal to the threshold value notified from the relay station 11 (step S32). As a trigger for changing the master unit, when the storage battery remaining level of the present master unit (for example, the slave unit 1) becomes less than the threshold value, a master unit change request is sent to the relay station 11 (step S33).

In response to the master unit change request, the relay station 11 sends test signals to the terminal devices 16 in the network 15 (step S34). According to the distance from the relay station 11 and the link status, etc., the range of the terminal devices 16 that receive the test signals may change. In the example of FIG. 4, the slave units 20, 1, 2 receive the test signals, and send self-device information such as the reception intensity and the storage battery remaining level to the relay station 11 (steps S35a, S35b, 35c).

The relay station 11 determines master unit candidates based on the received slave unit information (step S37), and sends a master unit request to the slave unit 2 that has been selected from the candidates (step S38). Furthermore, the relay station 11 sends a notification of the storage battery remaining level threshold value for the selected slave unit 2 (step S39). The slave unit 2 starts to implement master unit control, and monitors the storage battery remaining level of the self-device (step S41).

Subsequently, in a similar manner as described above, when the storage battery remaining level of the slave unit 2 becomes less than the threshold value notification from the relay station 11, a master unit change request is sent from the slave unit 2 to the relay station 11, and the relay station 11 selects a new master unit.

By the above method, the terminal device 16 that has been selected as the master unit monitors the storage battery remaining level of the self-device based on the threshold value notification from the relay station 11, and according to the storage battery remaining level, the master unit is changed. The battery consumption amounts of the terminal devices 16 in the entire network are smoothened, thus preventing network disconnection from being caused due to the exhaustion of a battery of a particular master unit.

Note that the trigger for changing the master unit may be when communication by the terminal devices 16 that is the master unit stops, or when wireless interruption occurs, other than when the storage battery remaining level of the self-device becomes less than the threshold value. In such cases, similar to the sequence when communication starts in FIG. 3, a terminal device 16 that first desires to send out signals becomes a provisional master unit, sends a master unit setting request to the relay station 11, and the process of FIG. 3 is performed.

Figure 5:
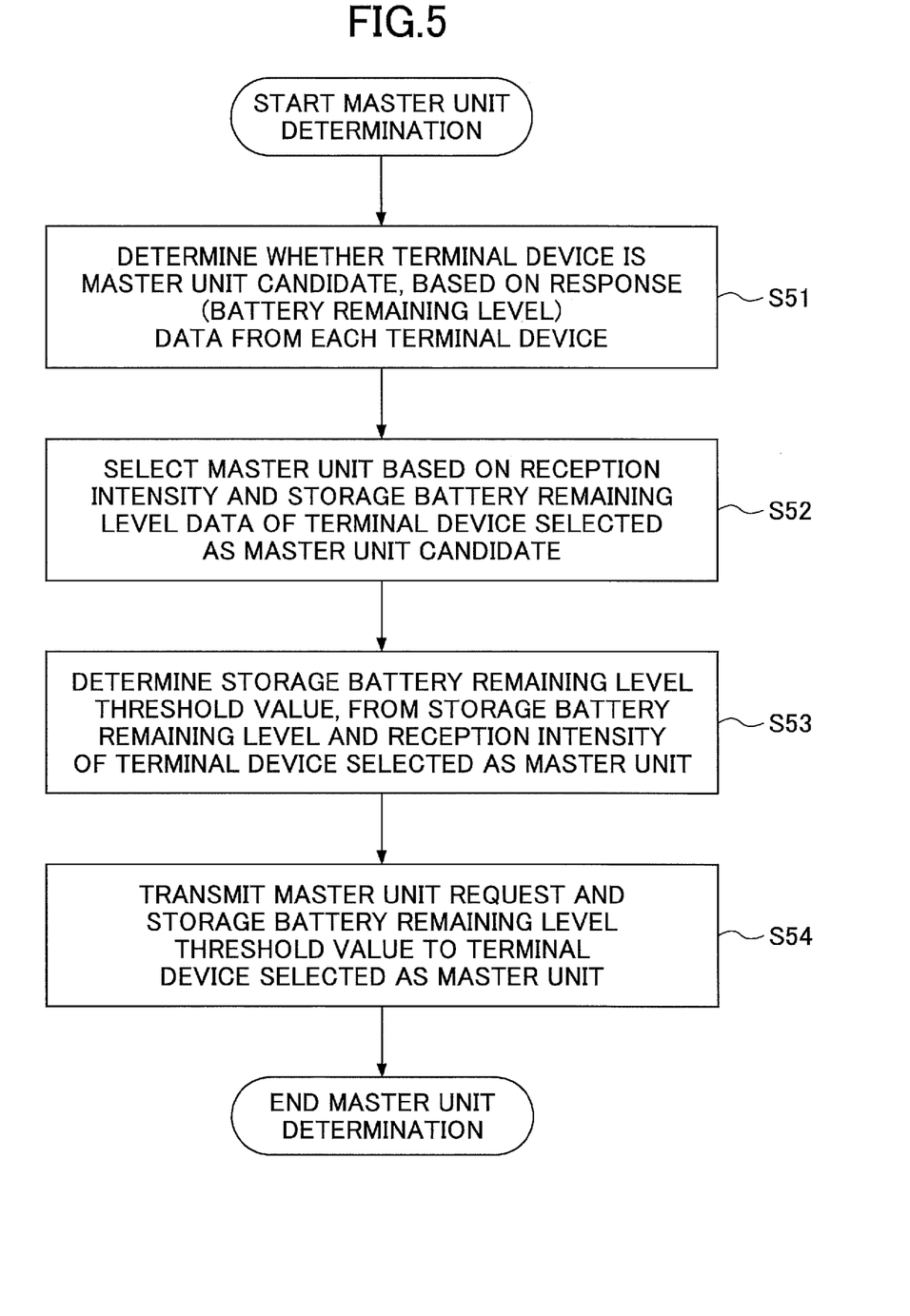
FIG. 5 is a flowchart of a master unit selection process.

FIG. 5 is a flowchart of a master unit candidate determination process (steps S17, S37) performed at the relay station 11. First, the relay station 11 determines whether a terminal device 16 is to become a master unit candidate based on a response from a terminal device 16 in the network 15 to test signals (step S51). The response includes information such as the storage battery remaining level and the reception level of the terminal device 16 that is the transmission source. The relay station 11 may determine all of the terminal devices 16 that have sent a response to the test signals to be master unit candidates, or may determine terminal devices 16 having a storage battery remaining level that is greater than or equal to a certain level among these terminal devices 16 to be master unit candidates.

Next, from among the terminal devices 16 selected as master unit candidates, the relay station 11 selects the master unit based on the reception intensity and the storage battery remaining level (step S52). Graduated evaluation values (points) may be set for the reception intensity and the storage battery remaining level, and the sum of both points may be used as determination values. Furthermore, the graduated evaluation values may be weighted. For example, when the reception intensity is high and the storage battery remaining level is low, stable communication is possible by low transmission power near the relay station 11 or in a good radio wave environment, but the storage battery remaining level is considered to be insufficient for processing a large amount of data as a master unit. In this case, the weight of the evaluation value of the storage battery remaining level is set to be low. Alternatively, when the reception intensity is mid-level and the storage battery remaining level is high, a certain amount of transmission power is needed for communication with the relay station 11; however, the storage battery remaining level is sufficient for processing a large amount of data as a master unit and sending the data to the relay station 11. In this case, the weight of the evaluation value of the storage battery remaining level is set to be high. A terminal device 16 having a high total evaluation value of the reception intensity and the storage battery remaining level, is selected as a master unit.

Next, the relay station 11 determines a storage battery remaining level threshold value to be set for the selected master unit (step S53). The threshold value is, for example, determined from a threshold value determining table included in the relay station 11.

Lastly, the relay station 11 instructs a transmission unit to transmit a master unit request and the storage battery remaining level threshold value to the selected terminal device 16 (step S54).

Figure 6:
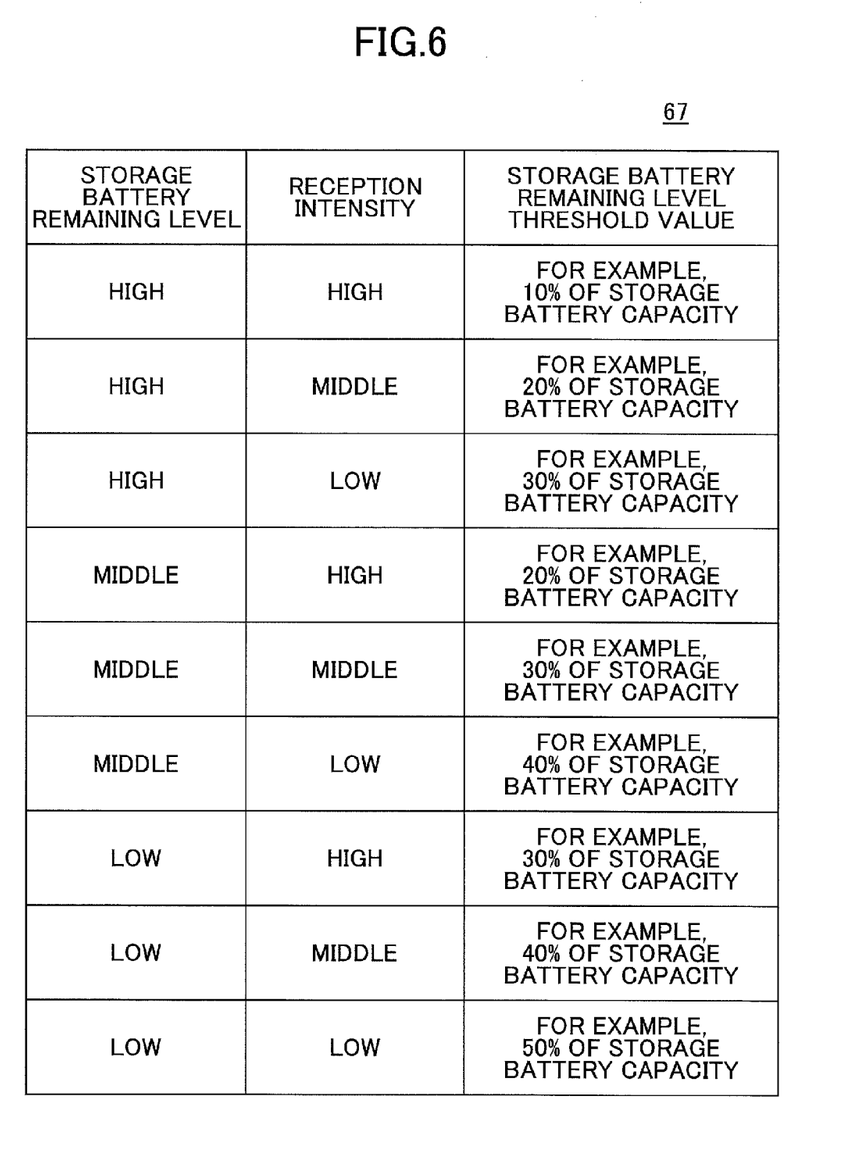
FIG. 6 illustrates an example of a battery remaining level threshold value determination table.

FIG. 6 illustrates an example of a threshold value determination table 67 included in the relay station 11. The threshold value of the storage battery remaining level is correlated with the reception intensity and the storage battery remaining level of the terminal device 16. For example, when the storage battery remaining level is about the same for plural terminal devices 16, the storage battery remaining level threshold value is set to be low for the terminal device 16 having a high reception intensity. Conversely, when the storage battery remaining level is about the same for plural terminal devices 16, the storage battery remaining level threshold value is set to be high for the terminal device 16 having a low reception intensity. When the reception intensity of test signals is low at the terminal device 16, it means that the terminal device 16 is far away from the relay station 11, and a large amount of power is needed for the terminal device 16 to send the collected data to the relay station 11. In this case, in order to smoothen the storage battery remaining level in the entire network, it is preferable to quickly send a master unit change request from the terminal device 16 and re-select the next master unit. On the other hand, when a terminal device 16 has a high reception intensity, it means that the terminal device 16 is positioned near the relay station 11, or the radio environment is good. In this case, it is possible to send the data to the relay station 11 by a relatively small amount of power, and the power for driving the terminal device 16 may be reduced. Therefore, a lower storage battery remaining level threshold value is set for the terminal device 16 having high reception intensity than the threshold value for the terminal device 16 having low reception intensity. Accordingly, over a long span, it is possible to smoothen the storage battery remaining levels in the entire SUN 15.

In the example of FIG. 6, when both the reception intensity and the storage battery remaining level are high for the selected master unit, the threshold value is set to be 10% of the present storage battery capacity (remaining level). When the reception intensity is low but the storage battery remaining level is high for the selected master unit, the threshold value is set to be 30% of the present storage battery capacity (remaining level).

Figure 7:
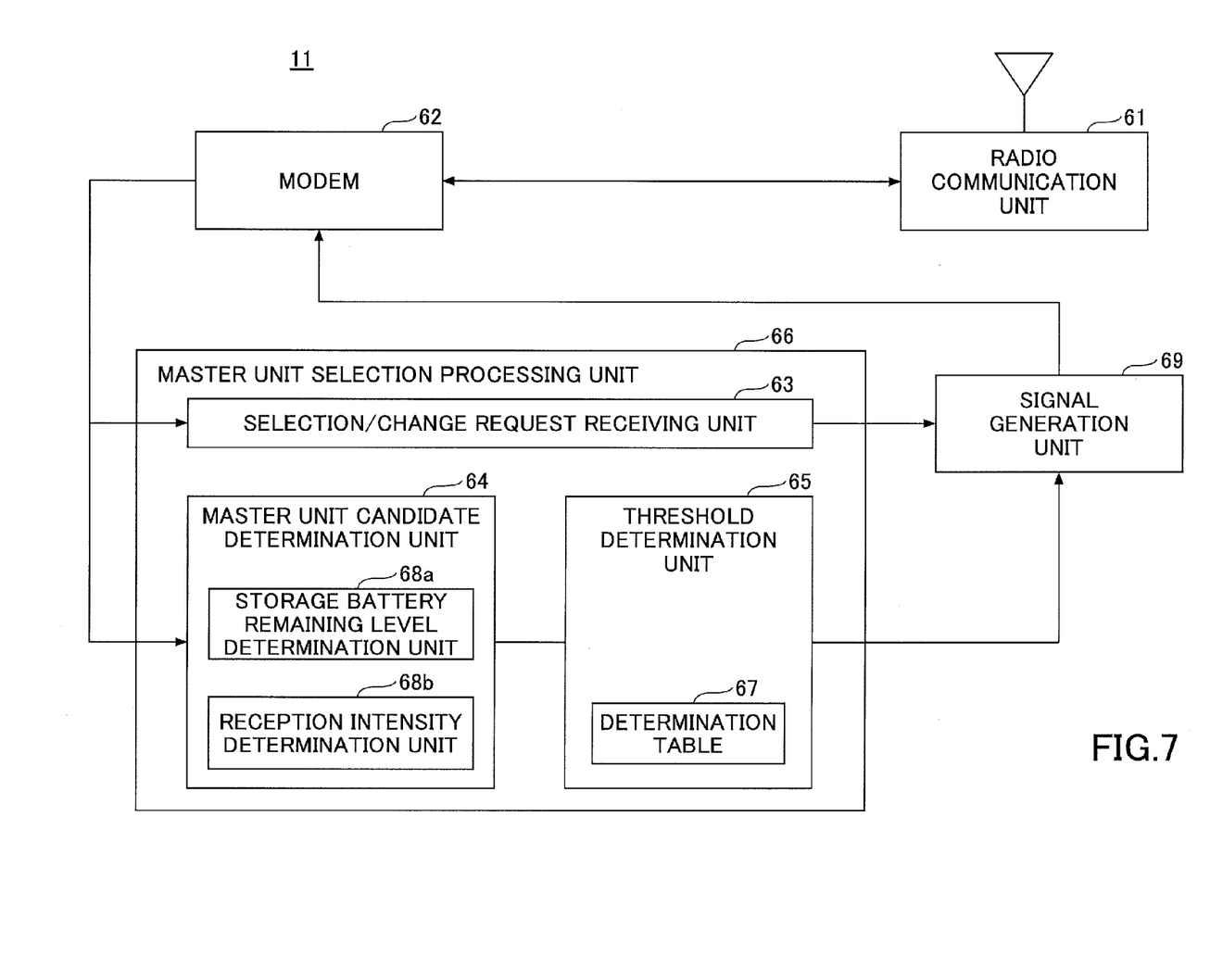
FIG. 7 is a schematic block diagram of a relay station.

FIG. 7 is a schematic block diagram of the relay station 11 used in the embodiment. The relay station 11 includes a wireless communication unit 61, a MODEM 62, a master unit selection processing unit 66, and a signal generation unit 69. The master unit selection processing unit 66 includes a selection/change request receiving unit 63, a master unit candidate determination unit 64, and a threshold determination unit 65. The master unit candidate determination unit 64 includes a storage battery remaining level determination unit 68a and a reception intensity determination unit 68b. The threshold determination unit 65 includes the threshold value determination table 67 illustrated in FIG. 6.

When the relay station 11 receives, by the wireless communication unit 61, a master unit selection request (when starting communication) or a master unit change request (during communication), the relay station 11 starts a change process by the master unit selection processing unit 66. The selection/change request receiving unit 63 instructs the signal generation unit 69 to generate test signals. The generated test signals are sent from the wireless communication unit 61 via the MODEM 62.

When the wireless communication unit 61 receives response signals to the test signals, the master unit candidate determination unit 64 extracts, from the response signals, terminal information of the terminal device 16 that is the transmission source, such as identification information, the storage battery remaining level, and the reception intensity. The master unit candidate determination unit 64 determines whether the terminal device 16 is to become a master unit candidate based on the determination results obtained by the storage battery remaining level determination unit 68a and the reception intensity determination unit 68b, and selects a terminal device 16 to become the master unit from among the candidates. When a master unit is selected, the threshold determination unit 65 refers to the threshold value determination table 67, and determines the storage battery threshold value for the selected terminal device 16. In the above example, the storage battery threshold is determined based on the reception intensity and the present storage battery remaining level of the selected terminal device 16.

When the master unit and the storage battery threshold value are determined, the master unit selection processing unit 66 instructs the signal generation unit 69 to generate a master unit request notification. The threshold value may be included in the master unit request notification, or a separate threshold value notification signal may be generated.

The generated master unit request notification and threshold value are sent from the wireless communication unit 61 to the selected terminal device 16 via the MODEM 62.

Figure 8:
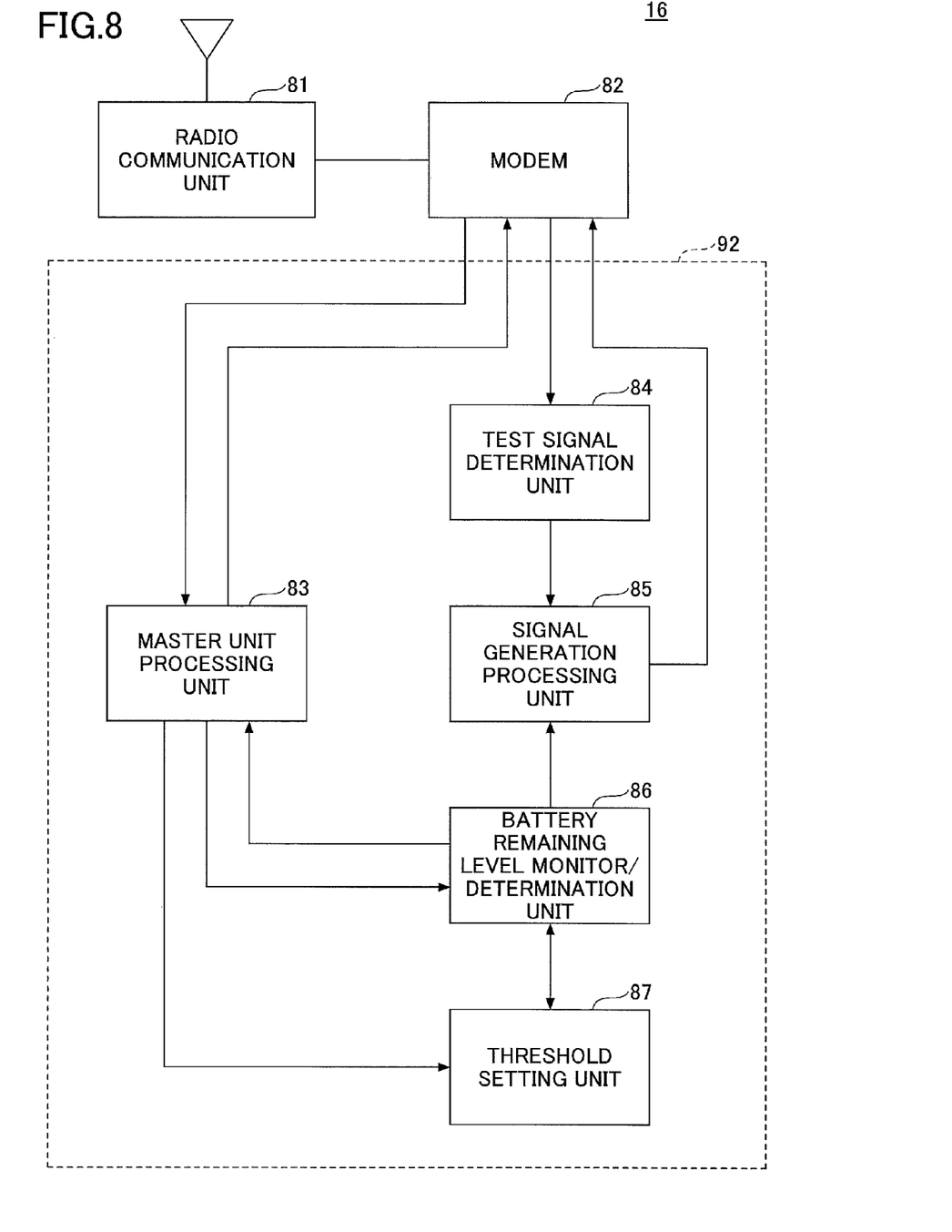
FIG. 8 is a functional block diagram of a terminal device.

FIG. 8 is a functional block diagram of the terminal device 16. The terminal device 16 includes a wireless communication unit 81, a MODEM 82, a master unit processing unit 83, a test signal determination unit 84, a signal generation processing unit 85, a battery remaining level monitor/determination unit 86, and a threshold setting unit 87. The master unit processing unit 83, the test signal determination unit 84, the signal generation processing unit 85, the battery remaining level monitor/determination unit 86, and the threshold setting unit 87 may be realized by a microprocessor 92.

When the terminal device 16 is operating as a slave unit, the wireless communication unit 81 receives test signals from the relay station 11 at arbitrary timings. The test signals are supplied to the test signal determination unit 84 via the MODEM 82. The test signal determination unit 84 determines whether the test signals are test signals from the relay station 11. When the test signals are from the relay station 11, the test signal determination unit 84 measures the reception intensity of the test signals, and notifies the measurement result to the signal generation processing unit 85. The signal generation processing unit 85 receives the storage battery remaining level detected by the battery remaining level monitor/determination unit 86. The signal generation processing unit 85 generates response signals to the test signals, and includes information regarding the reception intensity and the storage battery remaining level in the response signals. The response signals are sent from the wireless communication unit 81 via the MODEM 82.

When the terminal device 16 does not receive a master unit request notification from the relay station 11 within a certain time period after the response signals are sent out, the terminal device 16 continues operating as the slave unit. When the terminal device 16 receives a master unit request notification from the relay station 11 within a certain time period (that is to say, when the terminal device 16 is selected as the new master unit), the master unit request notification is supplied to the master unit processing unit 83 via the wireless communication unit 81 and the MODEM 82.

The master unit processing unit 83 starts processes as a master unit according to the master unit request notification. For example, the master unit processing unit 83 receives and integrates the data that has been cumulatively collected from the slave units in the communication range, and sends the integrated data to the relay station 11. At the same time as, or before or after starting processes as a master unit, the master unit processing unit 83 sets, in the threshold setting unit 87, the storage battery threshold value included in the master unit request notification, and instructs the battery remaining level monitor/determination unit 86 to monitor the storage battery remaining level of the self-device based on the set threshold value.

The battery remaining level monitor/determination unit 86 determines whether the storage battery remaining level of the self-device matches the threshold value set in the threshold setting unit 87. For example, when the storage battery remaining level becomes less than the threshold value, the battery remaining level monitor/determination unit 86 determines that the storage battery remaining level of the self-device does not match the threshold value, and instructs the signal generation processing unit 85 to generate a master unit change request. The signal generation processing unit 85 receives the instruction and generates a master unit change request. The master unit change request is sent from the wireless communication unit 81 via the MODEM 82.

The battery remaining level monitor/determination unit 86 may perform timer determination, instead of comparing the storage battery remaining level with the threshold value. The battery remaining level monitor/determination unit 86 may be configured to calculate the time until the storage battery remaining level becomes less than the threshold value, based on the notified threshold value, the present storage battery remaining level, and the average battery consumption amount of the past, and count the time. In another example, both the threshold value determination and the timer determination may be performed. In yet another example, the terminal device 16 may perform the threshold value determination and the relay station 11 may perform the tier determination.

Figure 9:
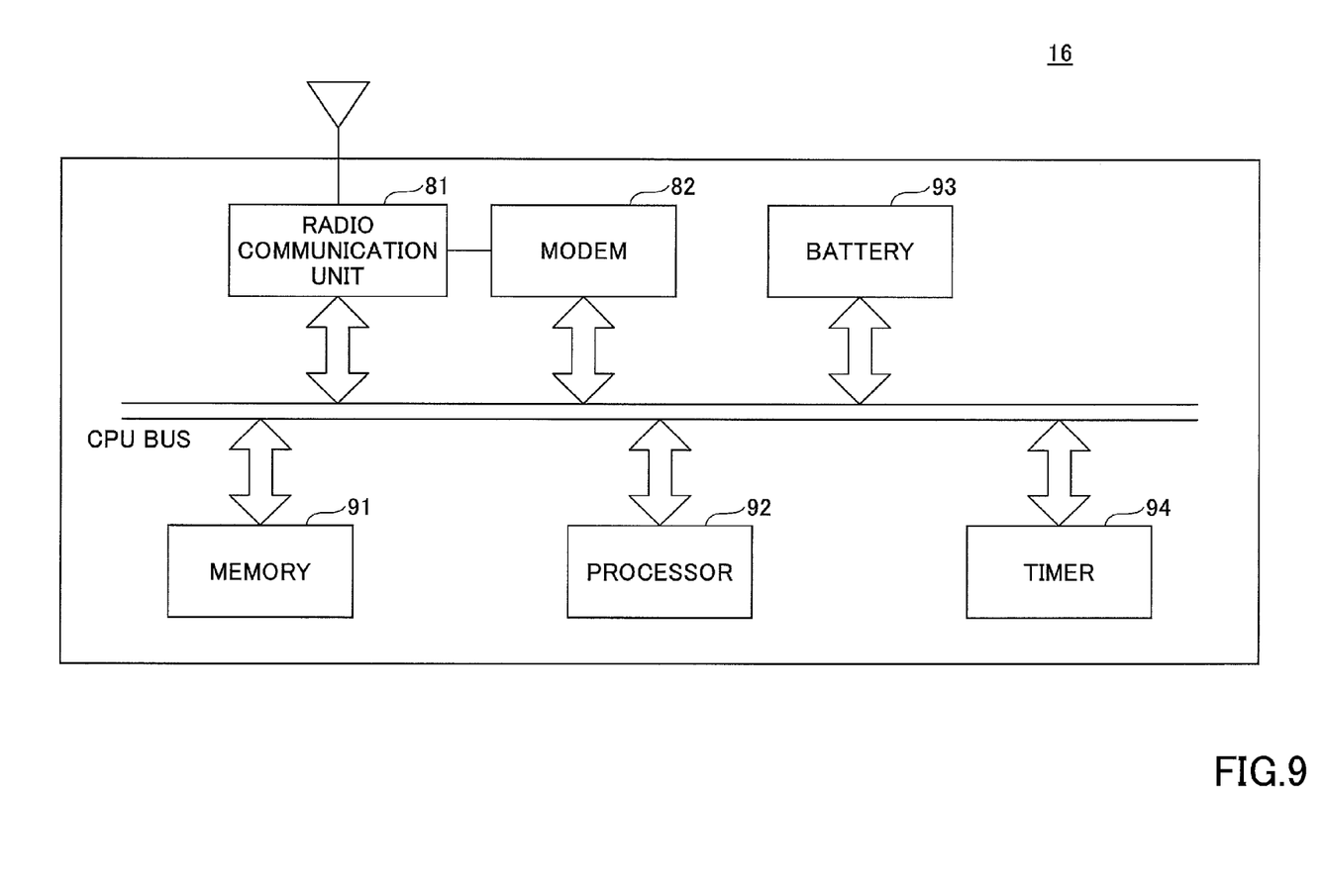
FIG. 9 is a hardware configuration diagram of the terminal device.

FIG. 9 is a hardware configuration diagram of the terminal device 16. The terminal device 16 includes a wireless communication unit (RF circuit) 81, a MODEM 82, a memory 91, a processor 92, a battery 93, and arbitrarily, a timer 94, which are interconnected by a CPU bus. The processor 92 executes the processes of the functional blocks illustrated in FIG. 8.

By the above configuration and method, the power consumption amount of all of the terminal devices 16 included in a network is smoothened, and the reliability of operations of the network over a long period of time is improved.

Note that variations and modifications may be appropriately made in the above embodiment. For example, as a determination standard for the master unit selection, an SN ratio may be used instead of the reception intensity. Furthermore, a procedure may be inserted for performing negotiation between the terminal device that has received the master unit request notification and the relay station. In this case, the certainty in selecting a master unit is improved.

Furthermore, in the above embodiment, the relay station 11 and the terminal device 16 are distinguished; however, one of the terminal devices 16 may be used as a relay station 11.

According to an aspect of the embodiments, the battery consumption of terminal devices (wireless communication devices) in a network is smoothened. Accordingly, the network is maintained over a long span.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication network system comprising:
   a first wireless communication device; and
   a plurality of second wireless communication devices, wherein
   the first wireless communication device is configured to select a master device from among the plurality of second wireless communication devices, on the basis of reception quality information and storage battery remaining levels of the plurality of second wireless communication devices, and to send, to the selected master device, a master device request notification and storage battery remaining level threshold information for the master device;
   a selected second wireless communication device selected as the master device from among the plurality of second wireless communication devices, is configured to operate as the master device in accordance with the master device request notification, and to monitor the storage battery remaining level of the selected second wireless communication device on the basis of the storage battery remaining level threshold information;
   when the storage battery remaining level of the selected second wireless communication device does not match the storage battery remaining level threshold information, the selected second wireless communication device sends a master device change request to the first wireless communication device; and
   the first wireless communication device is configured to determine the storage battery remaining level threshold information for the master device on the basis of the reception quality information and the storage battery remaining level of the selected second wireless communication device.

2. The wireless communication network system according to claim 1, wherein
   the first wireless communication device sends a test signal to the plurality of second wireless communication devices when the master device change request is received;
   the first wireless communication device is configured to receive, from each of the plurality of second wireless communication devices that has received the test signal, a response signal including the reception quality information of the test signal and the storage battery remaining level of the corresponding second wireless communication device; and
   the first wireless communication device is configured to select a new master device from among the plurality of second wireless communication devices that are transmission sources of the response signal.

3. The wireless communication network system according to claim 2, wherein
   the first wireless communication device is configured to determine, as a master device candidate, the second wireless communication device whose storage battery remaining level is greater than or equal to a certain level, among the plurality of second wireless communication devices that are the transmission sources of the response signal.

4. The wireless communication network system according to claim 1, wherein
   the selected second wireless communication device is configured to collect data from other second wireless communication devices among the plurality of second wireless communication devices, and to send the data to the first wireless communication device.

5. The wireless communication network system according to claim 1, wherein
   the first wireless communication device is connected to a power transmission line provided with a communication channel.

6. The wireless communication network system according to claim 1, wherein
   each of the plurality of second wireless communication devices includes a meter for measuring an energy usage amount.

7. A wireless communication station, comprising:
   a processor; and
   a wireless communication circuit, wherein
   the wireless communication circuit is configured to receive, from a plurality of wireless communication devices, reception quality information and storage battery remaining level information of the plurality of wireless communication devices;
   the processor is configured to perform a process including
      selecting a master device from among the plurality of wireless communication devices on the basis of the reception quality information and the storage battery remaining level information,
      determining a storage battery remaining level threshold value for the selected master device, on the basis of the reception quality information and the storage battery remaining level information of a selected wireless communication device selected as the master device from among the plurality of wireless communication devices, and
      generating a master device request notification including the storage battery remaining level threshold value; and
   the wireless communication circuit is configured to send the master device request notification to the selected master device.

8. The wireless communication station according to claim 7, wherein
   the process performed by the processor includes generating a test signal when the wireless communication circuit receives a master device change request from the selected master device;
   the wireless communication circuit is configured to send the test signal to the plurality of wireless communication devices, and receive a response signal to the test signal from one or more of the plurality of wireless communication devices; and the process performed by the processor further includes selecting a new master device from among the plurality of wireless communication devices, on the basis of the reception quality information and the storage battery remaining level information of the one or more of the plurality of wireless communication devices that are transmission sources of the response signal, the response signal including the reception quality information and the storage battery remaining level information.

9. The wireless communication station according to claim 8, wherein the process performed by the processor further includes determining, as a master device candidate, a wireless communication device whose storage battery remaining level is greater than or equal to a certain level, among the one or more of the plurality of wireless communication devices that are the transmission sources of the response signal.

10. The wireless communication station according to claim 7, wherein the wireless communication station is connected to a power transmission line provided with a communication channel.

11. A battery consumption smoothing method performed in a wireless communication network system including a first wireless communication device and a plurality of second wireless communication devices, the battery consumption smoothing method comprising:

selecting, by the first wireless communication device, a master device from among the plurality of second wireless communication devices, on the basis of reception quality information and storage battery remaining levels of the plurality of second wireless communication devices;

sending, from the first wireless communication device to the selected master device, a master unit request notification and storage battery remaining level threshold information for the master device;

operating as the master device in accordance with the master device request notification, by a selected second wireless communication device selected as the master device from among the plurality of second wireless communication devices, and monitoring the storage battery remaining level of the selected second wireless communication device on the basis of the storage battery remaining level threshold information;

sending, by the selected second wireless communication device, a master device change request to the first wireless communication device, when the storage battery remaining level of the selected second wireless communication device does not match the storage battery remaining level threshold information; and determining, by the first wireless communication device, the storage battery remaining level threshold information for the master device on the basis of the reception quality information and the storage battery remaining level of the selected second wireless communication device.

12. The battery consumption smoothing method according to claim 11, further comprising:

sending, by the first wireless communication device, a test signal to the plurality of second wireless communication devices when the master device change request is received, receiving, by the first wireless communication device, from each of the plurality of second wireless communication devices that has received the test signal, a response signal including the reception quality information of the test signal and the storage battery remaining level of the corresponding second wireless communication device, and selecting, by the first wireless communication device, a new master device from among the plurality of second wireless communication devices that are transmission sources of the response signal.

13. The battery consumption smoothing method according to claim 12, further comprising:

determining, by the first wireless communication device, as a master device candidate, the second wireless communication device whose storage battery remaining level is greater than or equal to a certain level, among the plurality of second wireless communication devices that are the transmission sources of the response signal.

14. The battery consumption smoothing method according to claim 11, further comprising:

collecting, by the selected second wireless communication device, data from other second wireless communication devices among the plurality of second wireless communication devices, and sending the data to the first wireless communication device.

* * * * *